May 30, 1961 — G. E. CODDING — 2,986,361
AIRCRAFT COCKPIT ARRANGEMENT
Filed July 20, 1959 — 2 Sheets-Sheet 2
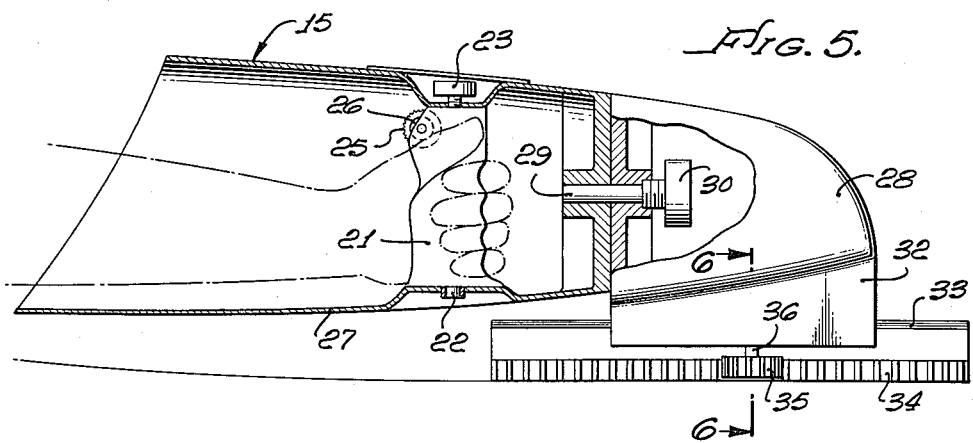
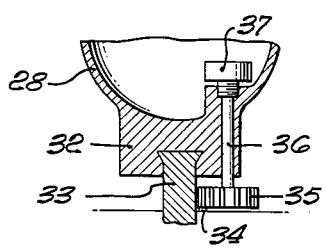
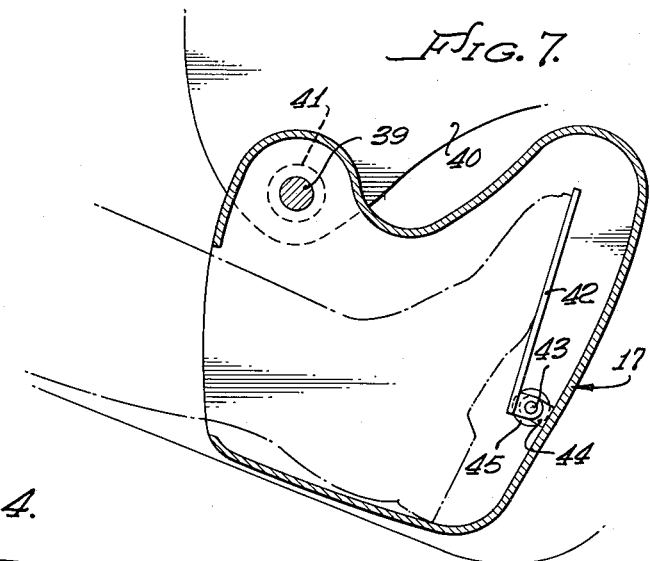
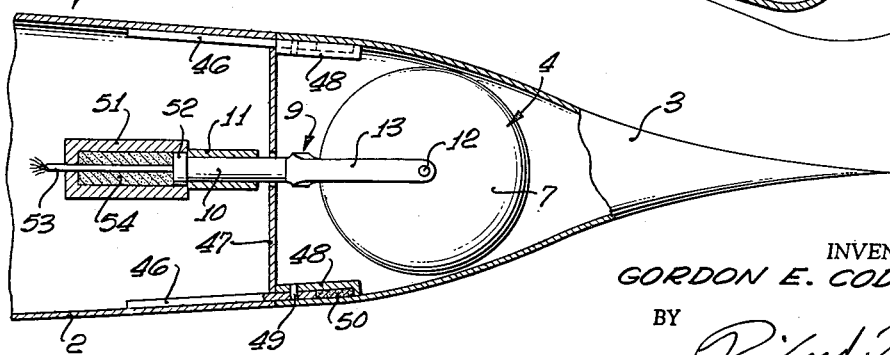
INVENTOR.
GORDON E. CODDING
BY
Richard F. Carr
ATTORNEY.

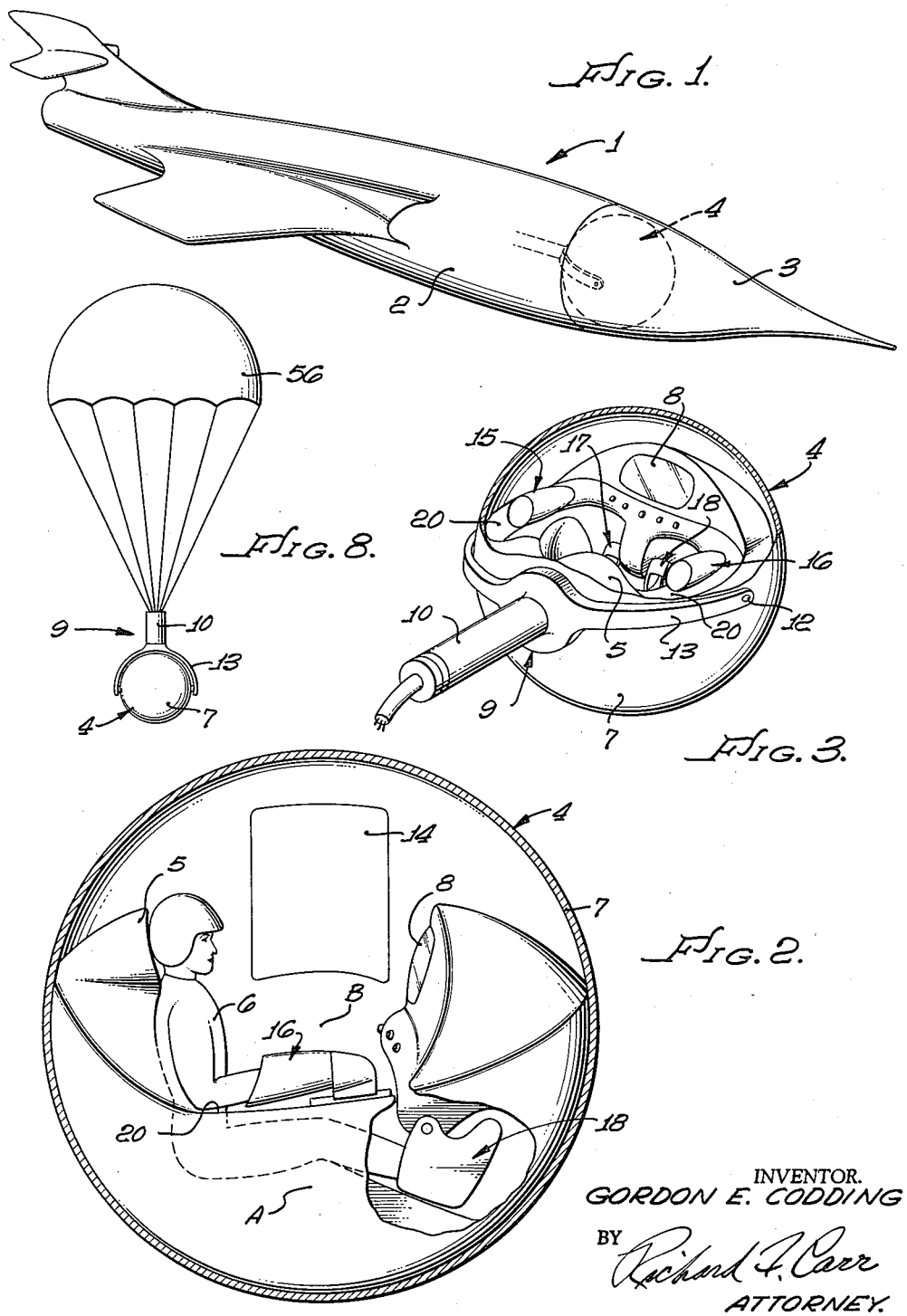

United States Patent Office 2,986,361
Patented May 30, 1961

2,986,361
AIRCRAFT COCKPIT ARRANGEMENT
Gordon E. Codding, 4572 W. 147th St., Lawndale, Calif.
Filed July 20, 1959, Ser. No. 828,087
9 Claims. (Cl. 244—140)

This invention pertains to an arrangement for an aircraft, and more particularly to a means for housing the pilot and for operating the controls of the aircraft.

The device of this invention is particularly adapted for advanced supersonic type aircraft, altthough many of its teachings are usable in airplanes of more conventional variety. It provides an arrangement whereby the pilot of the aircraft is housed within a sealed capsule secured to the aircraft by universal mounting means so that the pilot is maintained in a proper attitude with respect to any acceleration forces encountered. The seating for the pilot and the provisions for engaging and operating the controls are arranged to given maximum comfort and safety.

It is an object of this invention to provide an aircraft arrangement which reduces the fatigue of the pilot and increases the safety of the operation of the aircraft.

Another object of this invention is to provide an aircraft arrangement in which the pilot is always maintained in a proper position with respect to his controls.

A further object of this invention is to provide a capsule for receiving the pilot, which capsule is universally mounted with respect to the airplane and may be detached and recovered as a unit.

Yet another object of this invention is to provide an aircraft arrangement in which the pilot always is maintained in the proper physical attitude despite maneuvering and acceleration forces imposed.

An additional object of this invention is to provide an aircraft control arrangement where the hands and feet of the pilot are received in receptacle units used in operating the controls.

These and other objects will become apparent from the following detailed description taken in connection with the accompanying drawing in which:

Fig. 1 is a perspective view of an aircraft embodying the provisions of this invention, Fig. 2 is an enlarged sectional view of the pilot's compartment, Fig. 3 is a perspective view, partially broken away, of the pilot's compartment and universal mounting arrangement, Fig. 4 is a longitudinal sectional view of the aircraft forward portion, Fig. 5 is an enlarged fragmentary view, partially in section, of a glove hand control unit, Fig. 6 is a transverse sectional view taken along line 6—6 of Fig. 5, Fig. 7 is a sectional view of a boot foot control unit, and Fig. 8 is an elevational view of the pilot's compartment in descent following ejection from the aircraft.

As seen in Fig. 1 of the drawing, an aircraft 1 includes a fuselage 2 provided at its forward end with an ogival nose section 3. Supported within the fuselage but extending into the nose section 3 is pilot's compartment 4. This compartment is in the form of a spherical capsule entirely buried within the outer skin of the aircraft and completely sealed while the aircraft is in flight.

As may be seen in Figs. 2 and 3, capsule 4 includes a form-fitting seat 5 for the pilot 6. This seating arrangement provides full support for the head, shoulders, and thighs of the pilot giving him more comfort and resulting in less fatigue and increased safety. The skin 7 of the capsule is opaque and the pilot is provided with no windshield or canopy for conventional observation of his surroundings. Such information is conveyed to the pilot by a screen 8 disposed in front of the pilot which receives an image of the surroundings of the aircraft. This may be accomplished by well known electronic means such as closed circuit television. Entrance to and exit from capsule 4 are provided by door or latch 14 which is kept closed and sealed at all times during flight.

As best seen in Figs. 3 and 4, capsule 4 is attached to the body of the aircraft by a universal mounting arrangement 9. Preferably, this is in the form of a gimbals support cantilevered through shaft 10 from bearing 11 carried in the fuselage, and extending outwardly into the nose section where the capsule is located. Journals 12 at the sides of the capsule provide the connection to the yoke portion 13 of the gimbals.

It may be observed from the illustration of Fig. 2 that the pilot's seat is disposed in the lower portion of the capsule so that the center of gravity A of the capsule is below the center of rotation B of the capsule. In addition, operational equipment may be included beneath the pilot's seat to add to the mass of the capsule which is disposed below the center of rotation.

With the capsule mounted for universal movement with respect to the aircraft, and the center of gravity below the center of rotation, the resulting construction always will position the pilot in the proper attitude with respect to the acceleration forces imposed on the aircraft. In other words, with the aircraft flying in a straight, level path the center of gravity will maintain the capsule in the upright position illustrated in Fig. 2. The only acceleration forces acting on the capsule at that time will be the normal downward gravitational loads. However, upon maneuvering of the aircraft additional acceleration forces will be encountered in the form of the "g" loads resulting from the change in direction of the aircraft. These forces, acting through the center of gravity A of the capsule, pivot the capsule suitably with respect to its center of rotation B so that a different angular position is assumed. The acceleration forces, therefore, merely hold the pilot in the seat and do not tend to drive him violently to one side or to lift him off of the seat. This is advantageous because of added comfort to the pilot during flight of the aircraft. Even more important is the fact that with the pilot so located with respect to the "g" loads, greatly increased flight safety results. In other words, there is no tendency for the pilot's arms or legs to be driven about and torn from the controls. The pilot simply is held within his seat and maintained in the most advantageous position possible for continuing the direction of the aircraft.

Instead of the conventional control stick and pedals for operation by the pilot, the hand and foot controls are housed within glove and boot units 15, 16, 17, and 18. This type of arrangement again adds to the comfort of the pilot, reduces his fatigue, and eliminates any possible tendency for his hands and feet to be moved away from the controls. The pilot's seat includes arm rests 20 which support the arms of the pilot, while the forearms of the pilot are inserted within the gloves 15 and 16 and find additional support therein. Similarly the feet of the pilot within boots 17 and 18 are comfortably held and retained while the legs are given full support by seat 5.

The general construction of the glove assemblies and the manner in which they direct the means employed to control the action of the aircraft may be seen by reference to Figs. 5 and 6. Within left glove assembly 15, seen in Figs. 5 and 6, is a handle 21 which is grasped by the pilot when his hand is inserted into the glove. The handle is rotatable about its axis by being connected to the glove unit through mounting shaft 22, this movement being effected by wrist motion of pilot. Associated with shaft 22 is a potentiometer 23 or other means sensitive to this rotational movement of the handle. In other words, rotation of the handle about its axis also rotates shaft 22 and causes the wiper of the potentiometer to vary the resistance of the potentiometer in the normal manner. This potentiometer may be connected in turn to a suitable servo unit conveying a signal to one of the control media employed for operating the aircraft. For example, if conventional control surfaces are to be used, one or more of such surfaces may be driven by electric motors controlled in turn by the signal received from potentiometer 23. On the other hand, if jets of compressed fluid are employed for controlling the flight of the aircraft, these, too, will be operated by the signal from potentiometer 23. The exact arrangement for effecting the aircraft control by the signal from rotation of handle 21 is subject to some variation and may be accomplished in ways well known in the art. The important consideration here is the manner in which the potentiometer is operated to provide the signal.

For further control, a thumb wheel 25 is mounted transversely on the upper portion of handle 21, the rotation of which controls an additional potentiometer 26. The signal from control wheel 25 may be for fine adjustment such as in trimming the position of the aircraft, easily effected by movement of the wheel by the pilot's thumb while still grasping the control handle.

The rearward portion 27 of the glove unit is rotatably carried by forward portion 28 through a suitable connection provided by shaft 29. A potentiometer 30 in forward portion 28 of the assembly is operatively connected to shaft 29, so that rotation of the shaft by turning section 27 of the unit generates a signal indicative of the movement so provided. Handle 21 again is used by the pilot in rotating section 27 to give this additional signal.

Forward portion 28 of the glove unit may be made movable fore and aft by including a lower portion 32 receiving a rail 33 which is affixed to the pilot's seat or to the cockpit structure. Rail 33 includes a rack 34 on one side thereof engaged by a pinion 35. The latter connects through shaft 36 to potentiometer 37 carried by portion 28 of the glove assembly. Therefore, when the assembly is moved fore and aft along the rail, pinion 35 is rotated and in turn operates the signal producing arrangement of potentiometer 37 which is utilized in controlling the aircraft.

It may be seen from the foregoing, therefore, that the pilot may produce a variety of control signals through simple arm and wrist motions without ever removing his hand from the glove assembly or releasing his grasp from the handle therein. The glove assembly provides support for the pilot's arm and avoids inadvertent disengagement of the controls by the pilot. A combination of signals may be achieved by a combination of the various movements described.

It is apparent also that if fewer signals were desired for operating the control means for the aircraft, any of the motions provided for the glove assembly might be eliminated. For example, the device could be constructed so that handle 21 is not rotatable about its mounting shaft 22. If this were done, the signal from potentiometer 23 would not be produced, but the remaining potentiometers would be operative as before.

The operation for the boot units is generally similar in concept to that provided for the glove assemblies. As seen in Fig. 7, boot 17 is pivotal about the axis of shaft 39 which connects the boot to the structure 40 within the pilot's compartment. This movement of boot 17 rotates shaft 39 to operate potentiometer 41 which is connected to the shaft. A signal for transmission to the control of the aircraft is obtained in this manner.

In addition, within the boot there may be provided a pedal 42 connected to a shaft 43 at its bottom end which in turn is supported on bracket 44 from the interior of the boot. Potentiometer 45 is actuated when pedal 42 is pivoted about the axis of shaft 43. Again, a control signal is obtained.

Thus, like the glove assemblies, the boot units provide a full support for the pilot's foot and allow the production of several control signals without movement of the foot from within the boot.

In keeping with the greater safety which is obtained by the arrangement of this invention, the pilot's capsule preferably is made detachable from the aircraft for independent recovery in the event of an emergency. The pilot remains in the capsule and is not required to bail out in his own parachute. The general provision in this regard includes an explosive means for ejecting a nose portion 3, with an additional explosive means to eject the pilot's compartment 4. The latter includes its own parachute for allowing safe descent of the capsule.

The arrangement for ejecting the nose portion of the aircraft may include guide rails 46 projecting forwardly of bulkhead 47 of the aircraft fuselage (see Fig. 4). These rails are received in sockets 48 provided in the nose section, and the nose is attached to these guide rails by means of frangible pins 49. An explosive charge 50 is disposed in each socket forwardly of the guide rail. When exploded, the force shears off pins 49, driving the nose portion away from the aircraft fuselage for jettisoning.

Gimbals portion 10 projecting rearwardly into the aircraft fuselage and received in bearing 11 extends into a cylinder 51 retained therein by frangible collar 52. The wiring for the controls and other equipment of the pilot's capsule extends outwardly through the axis of gimbals shaft 10, and through a tube 53 to the exterior of cylinder 51. Surrounding this tube and within the cylinder is an explosive charge 54. When ignited the explosive gases drive the gimbals support away from the cylinder, through bearing 11, and away from the aircraft fuselage. Thus, the pilot's compartment is removed as a unit from the aircraft.

As seen in Fig. 8, a parachute arrangement is included for safe descent of the pilot's capsule. Parachute 56 may be stored within portion 10 of the gimbals' mechanism, and opened automatically when the pilot's capsule leaves the fuselage of the aircraft. The pivotal mounting of the capsule through journals 12 assures that the pilot will remain seated vertically as the capsule descends. Thus, the sealed capsule arrangement for the pilot with its universal mounting means is particularly adapted for safe escape from a rapidly flying aircraft. The pilot never is subjected to the outside environment as the capsule is ejected and thus is maintained with maximum safety throughout the descent.

It may be seen from the foregoing, therefore, that I have provided an improved aircraft arrangement in which the pilot remains in a relatively unchanging environment fully protecting him from all exterior elements or forces. The pilot's efficiency is improved materially in this manner and the aircraft may be controlled more effectively.

The foregoing detailed description is to be clearly understood as given by way of illustration and example only, the spirit and scope of this invention being limited solely by the appended claims.

I claim:

1. A hand operated control arrangement for a vehicle capable of travel above the earth's surface, said device comprising a receptacle adapted to receive the hand of a pilot of a vehicle, a handle within said receptacle rotatable about its axis relative to said receptacle, support means for said receptacle, said support means including a rotatable means for providing rotation of said receptacle about its axis, and a slidable means for providing axially slidable movement of said receptacle, and potentiometer means for connection to the control means for an aircraft, said potentiometer means being sensitive to such movement of said receptacle and of said handle.

2. In a vehicle capable of travel above the earth's surface having a fuselage and control means, a cockpit arrangement comprising a nose housing detachably connected to said fuselage, a substantially spherical sealable compartment in said nose housing, a gimbals supported in said fuselage and extending into said nose housing for supporting said compartment therein with freedom for universal rotational movement, a form-fitting seat in said compartment for the pilot of said aircraft, receptacle units in said compartment for receiving the hands and feet of the pilot, said receptacle units including movable means, and signal-producing means sensitive to movement of said movable means for operating the control means for said vehicle.

3. A device as recited in claim 2 including in addition explosive means for detaching said nose housing from said vehicle, explosive means for detaching said compartment, and parachute means connected to said compartment for recovering said compartment after said compartment is detached from said vehicle.

4. A device as recited in claim 2 in which said signal-producing means includes a plurality of potentiometers operatively connected to said movable means.

5. A device as recited in claim 4 in which for said movable means at least one of the receptacle units for the hands of the pilot includes a handle therein, said handle being rotatable about its axis for operating a signal-producing means, said receptacle being rotatable about its axis by said handle for operating a second signal-producing means and said receptacle unit being axially movable by said handle for operating a third signal-producing means.

6. A device as recited in claim 5 in which said signal-producing means include potentiometers, said handle being mounted on a shaft for operating a first potentiometer, said one receptacle unit being mounted on a second shaft for operating a second potentiometer, and said receptacle unit being mounted on guide means for axial movement thereof and including gear means for operating a third potentiometer.

7. A device as recited in claim 2 in which at least one of said receptacle units for receiving the feet of the pilot includes a boot-like member rotatable about a transverse axis for operating a first signal-producing means, and further including a pedal member in said boot-like member rotatable about a transverse axis for operating a second signal-producing means.

8. In a vehicle capable of travel above the earth's surface and having control media for controlling the direction of said vehicle, a detachable nose portion for said vehicle; a sealed substantially spherical compartment adapted to house the pilot of said vehicle; universal mounting means supporting said compartment within said nose portion; means for detaching said universal mounting means from said vehicle; and signal producing means within said compartment for providing an operating signal for said control media, said signal producing means including a duality of substantially tubular receptacle units each of which is adapted to receive a hand of the pilot, mounting means for mounting each of said receptacle units in said compartment in a fixed relationship therewith except for freedom for limited axial movement, and for rotation about the axis thereof, a handle in each of said receptacle units rotatable relative thereto, and signal generating means connected to each of said receptacle units and to said handle, said signal generating means being responsive to said movement and rotation of said receptacle units and said handle for thereby generating a signal for said control media.

9. In a vehicle capable of travel above the earth's surface, said vehicle having means for establishing the direction of travel thereof, a control arrangement for said vehicle comprising a form fitting seat in said vehicle for supporting the occupant of said vehicle in a seated position, a duality of substantially tubular receptacle units each of which is adapted to receive and support a hand of the occupant of said vehicle; and a duality of receptacle units, each of which is adapted to receive and support a foot of the occupant of said vehicle, all of said receptacle units being movable relative to and located in said vehicle adjacent said seat, and including means for transmitting a control signal to said direction determining means.

References Cited in the file of this patent

UNITED STATES PATENTS

| 2,369,258 | Shebat | Feb. 13, 1945 |
| 2,497,153 | Cosakis | Feb. 14, 1950 |
| 2,523,262 | Amtmann | Sept. 26, 1950 |
| 2,702,680 | Heinemann et al. | Feb. 22, 1955 |
| 2,787,746 | Redmond | Apr. 2, 1957 |

OTHER REFERENCES

Flight magazine, volume LXI; No. 2266, June 27, 1952, pages 774 and 775 relied upon.